United States Patent [19]

Maruniak

[11] 3,978,605
[45] Sept. 7, 1976

[54] FLOATING FISH GRIP

[75] Inventor: Adam Maruniak, Otsego, Mich.

[73] Assignee: Meto-Plast Corporation, Kalamazoo, Mich.

[22] Filed: May 30, 1975

[21] Appl. No.: 582,346

[52] U.S. Cl. .................................. 43/5; 294/115
[51] Int. Cl.² .................................. A01K 97/14
[58] Field of Search .................. 43/5, 6, 4; 294/26, 294/106, 110 A, 19 R, 115; 17/66, 70; 119/151, 154

[56] References Cited
UNITED STATES PATENTS

| 618,640 | 1/1899 | Burk | 294/115 |
|---|---|---|---|
| 1,501,965 | 7/1924 | Moors | 294/115 |
| 1,961,421 | 6/1934 | Hogenson | 294/115 |
| 2,930,648 | 3/1960 | Allan | 43/5 |
| 3,208,786 | 9/1965 | Eddleman | 43/5 |
| 3,718,359 | 2/1973 | Omdoll, Jr. | 294/26 |
| 3,833,252 | 9/1974 | Redding | 43/5 |

Primary Examiner—Warner H. Camp
Attorney, Agent, or Firm—Gordon W. Hueschen

[57] ABSTRACT

A cheliform fish grip having an over-all specific gravity of less than that of water is obtained by constructing the parts of a plastic having a specific gravity greater than 1., and constructing the handle with an air compartment of sufficient size to reduce the over-all specific gravity to less than 1. The jaws of the fish grip are pivotally mounted on a body, an actuator is slidably mounted in the body and spring biased levers are pivotally connected to the actuator and to a central portion of each jaw.

4 Claims, 4 Drawing Figures

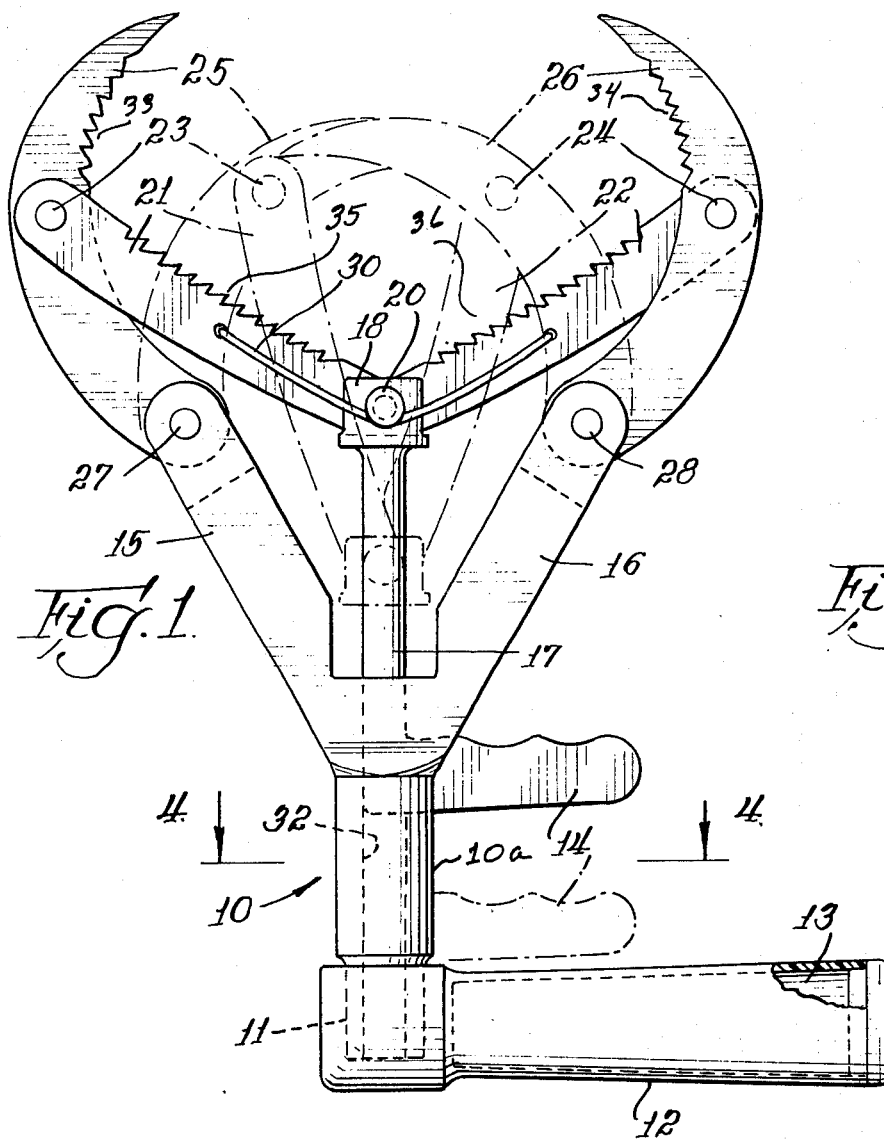
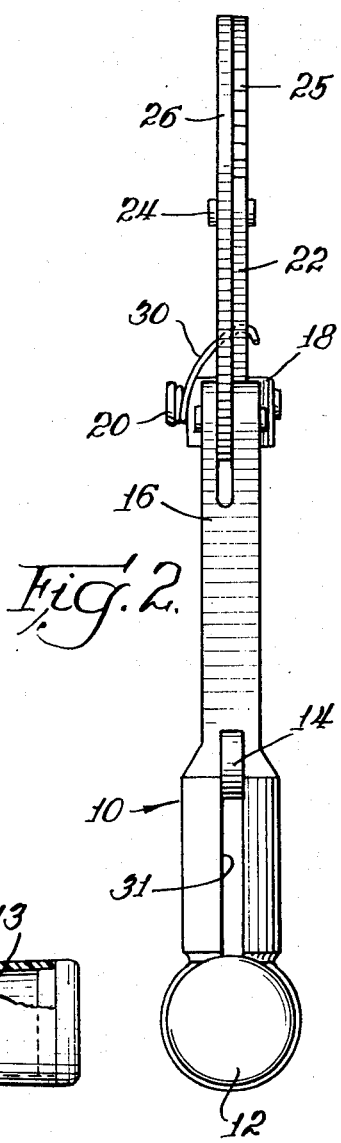
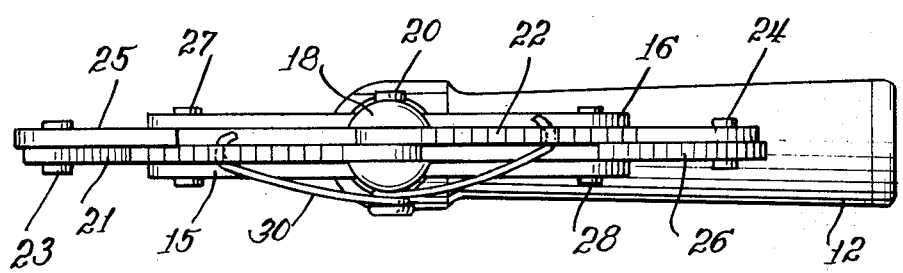
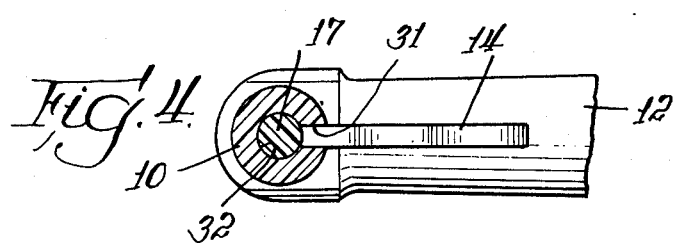

FLOATING FISH GRIP

BACKGROUND OF THE INVENTION

1. Field of the Invention

This invention relates to a cheliform fish grip in which a fish is boated by gripping it in the cheliform jaws of the fish grip.

2. Prior Art

Cheliform fish grips are known in the art. One such device has the cheliform jaws spring-biased to closed position. The jaws are held in an open position by a trigger mechanism and when the trigger contacts the fish, the jaws automatically close about the fish. In another such device the jaws are spring-biased to open position and are closed about the fish by a hand-operated mechanism.

OBJECTS

It is an object of the invention to provide an improved cheliform fish grip. Another object of the invention is to provide a cheliform fish grip having an over-all specific gravity of less than that of water. Still another object of the invention is to provide a cheliform fish grip of such size and shape that it can easily be placed in a tackle box.

SUMMARY OF THE INVENTION

These objects are accomplished in the present invention by making a cheliform fish grip from a plastic material having a specific gravity greater than 1., and including in its construction, advantageously, in the handle thereof, an air compartment of such size that the over-all specific gravity is reduced to less than 1. In a preferred embodiment there is provided a Y-shaped body member with cheliform jaws pivotally mounted at the ends of the Y and a transverse handle mounted at the end of the stem of the Y. Spaced from the handle, a handgrip distance, is a fingergrip parallel to the handle which is adapted to move toward and away from the handle. This fingergrip is linked to the jaws by suitable linkage whereby gripping of the fingergrip and pulling it toward the handle causes the jaws to close. The jaws are spring-biased to open position.

Advantageously, the linkage includes a rod which is axially movable in an axial bore in the stem of the Y, having one end affixed to the fingergrip and the other end having links pivoted thereto and to the mid-portions of the cheliform jaws. These links, as well as the cheliform jaws, may be seriated in order to provide a better gripping action.

BRIEF DESCRIPTION OF THE DRAWINGS

In the Drawings:

FIG. 1 is a dual position side view.
FIG. 2 is a right end view of FIG. 1.
FIG. 3 is a top view.
FIG. 4 is a section on line 4—4 of FIG. 1 (but in clamped positon).

DETAILED DESCRIPTION OF THE INVENTION

The fish grip of the invention shown in the drawings has a Y-shaped body 10 having a stem 10a and two arms 15 and 16. Pivoted at the ends of arms 15 and 16 are cheliform jaws 25 and 26. Fastened to the end of the stem is a handle 12.

The stem 10a has an axial bore 32 adapted to receive the axially movable rod 17. The axial rod 17 has a laterally projecting fingergrip 14 which projects through slot 31, which communicates with the axial bore 32.

The fingergrip 14 is spaced from the handle 12 a handgrip away, so that as it is drawn toward the handle, the rod 17 is retracted in the axial bore 32.

The free end 18 of the rod 17 is slotted to receive the ends of two connecting links 21 and 22, which are pivoted in the free end 18 of the rod, and again at the midportions of the cheliform jaws 25 and 26, as more particularly shown at 23 and 24. The links 21 and 22 are spring-biased by spring 30 to the open position shown in the solid lines. By pulling the fingergrip toward the handle, rod 17 and links 21 and 22 are retracted to the closed position shown in the broken lines.

The free end 18 of the rod 17 is enlarged to provide a slot wide enough to receive the ends of the links 21 and 22, which are pivoted therein by pivot pin 20. Link 21 is to the front of link 22 and is also to the front of the jaw 25. Similarly, link 22 which is to the back of link 21 is to the back of jaw 26. Slots are provided in the ends of the arms 15 and 16, which are offset from center as shown in FIG. 2, a distance equal to the thickness of the links and the cheliform jaws.

The handle 12 is recessed at 11 to receive the end of the stem 10a and may be secured thereto by an adhesive or by a transverse or axial rivet. If an axial rivet is used, the handle can be rotated, if desired for any reason. The handle is hollowed out to provide an air compartment 13, which is proportioned to the specific gravity of the materials from which the device is constructed so as to give an over-all specific gravity less than that of water.

In order to achieve this result effectively and without sacrificing size or strength, the device is constructed of plastic material which is strong and rigid and which does not have an excessively high specific gravty. Advantageously, the plastic should be both moldable and machinable, have a tensile strength of at least 5,000 psi, and a specific gravity of between about 1.1 and 1.2. Nylon 6 and nylon 6,6, which have a tensile strength of at least 7,000 psi and usually 9,000 or 10,000 psi, and a specific gravity around about 1.14 to 1.16, are admirably suited for the purpose. Other rigid plastics, however, such as polycarbonate, polymethacrylate and the like, as well as certain filled plastics which have the requisite strength and low specific gravity, can be used.

The pivots 20, 23, 24, 27, and 28 also may be composed of nylon or light plastics, or, since they constitute such a small proportion of the total weight of the device, they can be constructed of aluminum. Spring 30 can be constructed of ordinary spring steel or any other equivalent resilient material.

The jaws 25 and 26 and the links 21 and 22 may be seriated or saw-toothed as shown at 33, 34, 35, and 36. Advantageously, the teeth are slanted backward to provide a greater gripping action.

As shown in FIGS. 2 and 3, all the parts are substantially planar so that when the grip is lying flat, as in a tackle box, the greatest vertical dimension is the thickness of the handle. To further reduce the over all size for storage in a tackle box, the jaws may be tied in closed position by a rubber band or suitable bail.

If desired, the rod 17 may be seriated on one side to provide a rachet, which in cooperation with a suitable spring-biased pawl journaled in one of the arms 15 or 16, will operate to hold the jaws in gripping position until the pawl is released.

It is to be understood that the invention is not to be limited to the exact details of operation or structure shown and described as obvious modifications and equivalents will be apparent to one skilled in the art.

I claim:

1. A fish grip comprising a body member having at one end cheliform jaws adapted to encircle and grip a fish and at the other end a handle, means for holding the jaws in open position, and means for actuating the jaws to the closed or gripping position, said grip being characterized in that the parts are constructed of material having a specific gravity greater than one and the handle has an air compartment of sufficient size to reduce the over-all specific gravity to less than one; in that the jaws and the handle are made of rigid plastic which can be molded or machined, has a tensile strength of at least 5,000 psi, and has a specific gravity of about 1.1 to 1.2; in that the body member is Y-shaped, the cheliform jaws are pivotally attached to the arms of the Y-shaped body, and the handle is attached to the bottom of the stem of the Y-shaped body and projects laterally therefrom in the same plane as the jaws and forms a right angle with said stem; in that the means for actuating the jaws to the closed or gripping position, includes a fingergrip, which projects laterally from said Y-shaped body parallel to the handle without changing its parallel relation thereto, is spaced from the handle not more than a handgrip away, and has a spring-biased linkage to the cheliform jaws, which when the fingers apply pressure to the fingergrip, actuates the cheliform jaws against said spring bias to the closed or gripping position and continued pressure on the fingergrip, after a fish has been gripped, asserts a corresponding gripping pressure on the fish; in that the linkage comprises an axially movable member rigidly attached at one end to the fingergrip and pivotally attached at the other end to links which in turn are pivotally attached to the cheliform jaws at points intermediate their free ends and their pivoted ends; and, in that both the links and the cheliform jaws are seriated.

2. The fish grip of claim 1, in which the body member, the jaws, the linkage, and the handle are made of a rigid plastic which can be molded or machined, has a tensile strength of at least 9,000 psi, and has a specific gravity of about 1.1 to 1.2.

3. The fish grip of claim 2, in which the plastic is nylon 6 or nylon 6,6.

4. The fish grip of claim 1, in which the spring bias is effected by a spring having its mid-portion attached to the end of the axially movable member which is pivotally attached to the links and one end to one link and the other end to the other link.

* * * * *